| | | |
|---|---|---|
| [72] | Inventor | Robert E. Hill<br>Clayton, Mo. |
| [21] | Appl. No. | 746,738 |
| [22] | Filed | July 23, 1968 |
| [45] | Patented | Nov. 2, 1971 |
| [73] | Assignee | Monsanto Company<br>St. Louis, Mo. |

[54] WOOD TREATMENT
14 Claims, No Drawings

[52] U.S. Cl............................................. 106/2,
106/15, 106/18, 106/268, 106/271, 117/149
[51] Int. Cl..................................................... C09k 3/18
[50] Field of Search............................................ 106/271, 15
AF, 2, 18, 268; 117/149

[11] 3,617,314

[56] References Cited
UNITED STATES PATENTS

| | | | |
|---|---|---|---|
| 2,182,081 | 12/1939 | Hatfield......................... | 106/15 X |
| 2,371,473 | 3/1945 | Stanford........................ | 106/270 X |
| 2,635,055 | 4/1953 | Figdor........................... | 106/271 |
| 2,789,060 | 4/1957 | Spangenberg................ | 106/15 |
| 3,378,381 | 4/1968 | Draganov..................... | 106/15 |

*Primary Examiner*—Lorenzo B. Hayes
*Attorneys*—Neal E. Willis, Arnold H. Cole and William H. Hellwege, Jr.

ABSTRACT: A wood treatment composition which imparts water repellency to kiln-dried lumber.

WOOD TREATMENT

This invention relates to wood treatment compositions. More particularly, this invention relates to wood treatment compositions containing pentachlorophenol which are useful in providing water repellency to wood. The compositions may be used as unpigmented or pigmented compositions.

Water repellent compositions of various types have been known and used for wood treatment for a number of years. Such products, however, have a number of shortcomings. Compositions usually high in petroleum wax are suspensions of solids or semisolids in water and are not entirely stable to the shear of pump and spray nozzles. The suspension contains coagulated solids that do not disperse but eventually clog the spray nozzle on consecutive passes through the system.

Fungal and mold growth inhibitors such as pentachlorophenol or orthophenylphenol are normally a part of such compositions. However, there appears to be a trend toward the elimination of such inhibitors from water repellent systems since pentachlorophenol solutions are inherently difficult to emulsify and form a stable emulsion. The use of cationic emulsion systems is often unsuccessful because of the interaction of the cationic emulsifier with the pentachlorophenol. The nonionic, in particular the ethylene adducts of alkyl phenols, alkyl thio phenols, fatty alcohols and fatty acids are incompatible with pentachlorophenol. The more compatible emulsion systems are the anionic types which, with the exception of the amine soaps of certain lower boiling amines, are not irreversible when the water evaporates from the emulsion so that reemulsification will occur if the solution is again exposed to the action of water. When amine soaps of fatty acids or rosin acids are used to emulsify pentachlorophenol solutions the soap may be partially neutralized by the acidic reaction of the pentachlorophenol and excess amine must be added for efficient emulsification. In some cases, the amine salt of the neutralized pentachlorophenol is less soluble in the solution than the unreacted pentachlorophenol and an insoluble residue is formed. Since the pentachlorophenol is dissolved in a water immiscible solvent system, attempts to overcome its incompatibility by using the water soluble sodium pentachlorophenate in the water phase of the emulsion have been made. This approach has not met with any degree of success since the same incompatibility exists as with pentachlorophenol.

Commercial concentrates being suspensions of solids do not reconstitute when broken by freeze-thaw cycles, especially the concentrates containing pigments which cause a decrease in freeze-thaw stability as well as a decrease in shear stability.

It is therefore an object of this invention to provide compositions and a method for the treatment of wood.

It is a further object of the invention to provide a wood treatment composition which is dilutable with water and provides water repellency when applied to wood.

It is another object of the instant invention to provide a composition to which water dispersible pigments may be added to impart a chosen color to the treated lumber.

Further objects, advantages and features of this invention will be apparent to those skilled in the art from the following description and claims.

In accordance with this invention there is provided a fungicidal water repellent emulsifiable concentrate comprising from about 1 to about 30 percent of a pentaerythritol ester of rosin acids and rosin and fatty acid mixtures, from about 0.1 percent to about 20 percent of polychlorophenol, from about 1 percent to about 10 percent wax, from about 1 to about 15 percent low-titer $C_{10}$–$C_{20}$ fatty acids, from about 1 to about 20 percent $C_1$–$C_4$ alkyl alkanol amine, from about 30 to about 80 percent of a water immiscible solvent and from 0 to about 25 percent water.

Preferred formulations comprise from about 0.4 to about 30 percent of a pentaerythritol ester of rosin acids and rosin and fatty acid mixtures, from about 1.0 to about 20 percent of polychlorophenol, from about 2 to about 8 percent wax, from about 4 to about 8 percent low-titer $C_{10}$–$C_{20}$ fatty acids, from about 3 to about 18 percent $C_1$–$C_4$ alkyl alkanol amine, from about 30 to about 80 percent of a water immiscible solvent, and from about 7 to about 15 percent of water.

The formulations containing from about 7 to about 15 percent water are further diluted in ratios of one part of the formulation with from one to about 25 parts by volume of water to form a stable emulsion. It is preferred to dilute the formulation with from one to about 10 parts by volume of water for each part of formulation to form a stable emulsion.

The pentaerythritol esters employed in the compositions of this invention are those prepared from rosin acids and mixtures of rosin acids and fatty acids. Such rosin acids and mixtures of rosin acids and fatty acids are derived from many sources including tall oil rosin acids obtained from paper manufacture, gum rosin acids obtained from turpentine manufacture and wood rosin acids obtained from the distillation of wood. It is preferred that the rosin acid/fatty acids mixtures contain a high percentage of rosin acids. A preferred acid mixture useful in preparing a pentaerythritol ester useful in the practice of this invention contains approximately 75 percent rosin acids with the remainder being fatty acids and unsaponifiables. The use of the preferred acid mixture in forming a pentaerythritol ester results in the reaction of all of the fatty acids and all but approximately 8 percent of the rosin acids.

The pentaerythritol esters can be prepared by methods known to those skilled in the art, for example, by the direct esterification of the alcohol and acid or acid mixtures.

The polychlorophenols which are used in the practice of the instant invention are polychlorophenols having a wood preservative function, a fungicidal function and a toxic function. The polychlorophenols include 2,4,6-trichlorophenol, 2,4,5-trichlorophenol, 2,4,5,6-tetrachlorophenol, 2,3,4,6-tetrachlorophenol and pentachlorophenol. The polychlorophenol preferred for use in the practice of the instant invention is pentachlorophenol. Pentachlorophenol may be used in substantially pure form but from an economic point of view it is preferable to use the commercially available technical grade which contains a minimal amount of impurities including tetrachlorophenols and trichlorophenols. The instant invention is unique in that it provides a particularly satisfactory formulation for solubilizing and handling pentachlorophenol.

The amount of polychlorophenol that is employed in the practice of the invention may range from about 0.1 to about 20 percent. The preferred amount of polychlorophenol is about 1 to about 20 percent.

A variety of waxes can be employed in the practice of the present invention. The waxes derived from petroleum such as microcrystalline, semimicrocrystalline and crystalline waxes having melting points of from 100° to 150° F. are preferred. The most preferred waxes for use in the invention are the paraffin crystalline waxes which occur in various fractions of most types of crude petroleum. Since the paraffin crystalline waxes are derived from the fractionated cuts obtained upon distillation of the crude petroleum, they are frequently referred to as petroleum distillate waxes to distinguish them from the so-called microcrystalline waxes which are derived from certain tarry or more viscous residues remaining from certain fractionations occurring in the petroleum refining processes. The latter waxes consist of mixtures of isoparaffins, naphthenes and small amounts of aromatic and straight chain hydrocarbons. Usually, the microcrystalline waxes are separated by solvent recrystallization methods from the nondistillable pot or still residue obtained as a result of the fractional distillation of petroleum. They may be differentiated from the paraffin crystalline waxes in that they are characterized by higher molecular weights and higher boiling points than paraffin wax. Also, the microcrystalline waxes are generally more ductile and exhibit higher viscosities and higher refractive indices than paraffin waxes.

The paraffin waxes preferred for use in the present invention are derived from the overhead distillate fractions of petroleum and manifest melting points in the range of from about 117° to about 150° F. and Saybolt viscosities in the range of from about 35 S.U. to about 45 S.U. at 210° F. The paraffin waxes are further visibly characterized by crystallizing into large, well-formed distinct crystals of the plate and needle types. The physical characteristics of a paraffin wax may vary over the range indicated, depending upon the crude petroleum source, the portion of the crude which is used for wax production and the differences in refining techniques. The paraffin waxes are unsaponifiable but can be readily emulsified in water in the presence of a suitable emulsifying agent. In order to illustrate further the various types of paraffin waxes that are preferably utilized in this invention, a brief description will be given of the procedure employed in the manufacture of paraffin wax.

A customary fractionation of crude petroleum stocks yields light fractions or cuts comparatively rich in wax components which, as hereinbefore indicated, are termed paraffin or distillate wax. These paraffin rich fractions are normally liquid at elevated temperatures and upon cooling to lower temperatures, the wax content readily precipitates. After satisfactorily cooling a wax distillate, the precipitate is removed by a filtering process in the form of slack wax. Slack wax normally contains from about 20 to about 40 percent by weight oil content. Next, the slack wax is sweated, which operation merely consists of heat treating the wax whereby the oil therein drains from or sweats out of, the solid wax as the temperature is slowly raised. The sweating operation yields a crude scale wax containing about 2 percent by weight oil. Fully refined paraffin wax is then obtained by merely further sweating the crude scale wax to a specific melting point range followed by treatment with a suitable adsorbent. The fully refined product usually contains less than 0.5 percent by weight of oil. In the practice of the present invention, crude scale wax, semirefined paraffin waxes and slack waxes, or mixtures of the refined wax with either slack wax or scale wax can be employed.

The fatty acids useful in the compositions of the instant invention are low-titer $C_{10}$-$C_{20}$ fatty acids containing from 0 to about 50 percent rosin acids and include those derived from the Kraft process of paper making using pine wood. The preferred low-titer fatty acids are mixtures containing from about 1 to about 10 percent rosin acids, from about 1 to about 5 percent unsaponifiables and the remainder a mixture of oleic, linoleic and saturated acids. Fatty acids such as the commercially available oleic, linoleic and low-titer mixtures of fatty acids perform satisfactorily in the compositions of this invention.

The alkyl alkanol amines which are useful in the practice of this invention include dimethylethanol amine, diethylethanol amine, di-n-propylethanol amine, diisopropylethanol amine, diisopropylethanol amine, dibutylethanol amine, ethylethanol amine, mixtures of ethylethanol amine and ethyldiethanol amine and mixtures of isopropylethanol amine and isopropyldiethanol amine. The alkyl alkanol amines are generally used in a concentration of from about 1 to about 20 percent. It is preferred to employ from about 3 to about 18 percent alkyl alkanol amine in the compositions of this invention.

In general, the solvents suitable for use in the compositions of this invention are water immiscible, of low volatility and have low pour point. Examples of the solvents which can be used in formulating the compositions of this invention include mixtures of $C_8$ to $C_{16}$ alcohols, esters, ketones, ethers and acetals, aromatic hydrocarbon solvents such as xylene, toluene, cumenes, mesitylenes, alkyl naphthalenes, phenols, benzene, alkyl benzenes such as ethylbenzene, N-propylbenzene and the like; various petroleum derivative products such as kerosene, mineral spirits and the like. A particularly preferred solvent is a hydrocarbon solvent having an initial boiling point of above about 280° F. and a pour point below about 0° F.

In the preparation of the unpigmented or pigmented compositions, a sequestering agent may be added with the water to prevent precipitating of calcium and magnesium soaps. A sequestering agent found to be particularly useful in the practice of the instant invention is an aqueous solution of the tetrasodium salt of ethylene/diaminetetraacetic acid (commercially available as "Versene Powder," "Versene 67," "Versene 100." Other agents which can be used include the disodium salt and trisodium salt of ethylenediaminetetraacetic acid and mixtures thereof.

In the practice of the instant invention the fungicidal water repellent emulsifiable concentrates are provided by adding the pentachlorophenol, wax and pentaerythritol ester in a suitable solvent, such as mineral spirits and applying the required heat to dissolve the pentachlorophenol and wax. The fatty acid is added and the solution is cooled. The amine is then added to the solution with stirring. The resulting concentrate may be stored or used immediately as a base material for the preparation of unpigmented and pigmented compositions. The unpigmented emulsions which are used in the treatment of wood are prepared by first adding sufficient water to the aforedescribed concentrates to provide a formulation containing from about 7 to about 15 percent water. The resulting formulation is then further diluted with from about one to about 25 volumes of water to each volume of formulation to provide a stable emulsion.

Wood products are normally stained with coloring material for identification purposes, to cover up defects in the wood and to improve the appearance of the wood. The wood so treated normally will not maintain its color characteristics upon continuous exposure to the elements. As another aspect of this invention, wood may be treated with the pigmented compositions of this invention to impart permanent color to the treated wood which will resist continuous exposure to the elements.

The water dispersable pigments which are useful in the pigmented compositions of this invention include pigments well known in the commercial world such as titanium white, yellow oxide, chrome yellow, Hansa yellow, azo yellow, molybdate orange, dinitraniline orange, toluidine red medium, red oxide light, burnt sienna, phthalocyanine blue, phthalocyanine green, lamp black and the like.

The pigmented emulsions are prepared by adding water dispersable pigments to the required amount of water and mixing with the concentrate.

The pigmented emulsions generally contain from about 40 to about 65 percent of the concentrate and from about 0 to about 20 percent of pigment, the remaining components being water. Higher concentrations of water dispersible pigments require a lesser amount of concentrate and a higher amount of water to form a satisfactory pigmented emulsion.

The pigmented formulations prepared by the above procedure generally contain from about 1.0 to about 25 percent pentaerythritol esters of rosin acids, a mixture of rosin and fatty acids, from about 0.1 to about 16 percent polychlorophenol, from about 0.1 to about 3 percent wax, from about 1.0 to about 8 percent low-titer $C_{10}$-$C_{20}$ fatty acids, from about 1 to about 15 percent $C_1$-$C_4$ alkyl alkanol amine, from about 10 to about 65 percent of a water immiscible solvent, from about 0.1 to about 20 percent of a water dispersable pigment and from about 15 to about 70 percent water.

Preferred pigmented formulations comprise from about 1.7 to about 23.3 percent pentaerythritol ester of rosin acids or mixture of rosin and fatty acids, from about 0.4 to about 15.7 percent polychlorophenol, from about 0.4 to about 2.3 percent wax, from about 1.7 to about 6.3 percent low-titer $C_{10}$-$C_{20}$ fatty acids, from about 1.3 to about 14.0 percent $C_1$-$C_4$ alkyl alkanol amine, from about 13 to about 62.7 percent of a water immiscible solvent, from about 3 to about 20 percent of a water dispersable pigment and from 20 to about 65 percent water.

In carrying out the practice of this invention any one of various well-known methods of treating wood may be used, depending on the desired treatment in the wood product and in particular the degree of penetration desired. Such methods include brushing, spraying, dipping, soaking and pressure impregnation. Pressure treatments include empty cell and full cell procedures.

In the soaking procedure, the wood can be fastened down in an open tank containing the solution. Over a period of time, the air in the pores of the wood is displaced by the liquid. The unabsorbed solution is then drawn off.

In the empty cell procedure, the wood is placed in a pressure vessel, commonly a horizontal cylinder, and moderate air pressure is applied. An impregnant solution is then forced into the cylinder and into the wood. Pressure of up to 100-150 pounds per square inch gauge is applied, forcing the impregnant solution deep into the wood. The pressure is then released and the unabsorbed solution is removed from the cylinder. A vacuum is then applied and the residual air in the capillaries of the wood expands, thereby forcing the excess liquid in the pores from the wood. The wood pores are thus covered with a thin film of impregnant.

The full cell pressure procedure involves the application of a high vacuum initially to the pressure vessel containing the wood. An impregnating solution is added to the cylinder and surrounds the wood while the vacuum is maintained. Positive pressure is then applied to force the impregnant into the wood. At the end of the impregnation, the pressure is released. A final vacuum is applied, and the unabsorbed solution is removed from the cylinder.

Various modifications of the empty cell and full cell procedures may be used. For example, the impregnating solution may initially be admitted to the treating cylinder under atmospheric pressure in either procedure, or under a low vacuum.

Suitable woods which can be impregnated in accordance with the present invention are the hard and soft woods which can be green or seasoned, exemplary varieties being maple, mahogany, walnut, hickory, gum, oak and other hard woods, as well as Southern pine, Ponderosa pin, Douglas fir, hemlock, larch, redwood, Jack pine, Lodgepole pine, Red pine, Northern white pine, Sugar pine, Western white pine, ash, black locust, honey locust, beech, birch, red cedar, white cedar and other softwoods.

The wood preservative compositions of this invention are suitable for treating such wood products as electric power and telephone poles, cross arms, fence posts, millwork, construction timbers such as joists, girders, rafters and studding, bridge timbers, mine props and timbers, wood blocks for floors and platforms, and the like.

The invention will be more fully understood by reference to the following examples. These examples, however, are given for the purpose of illustration only and are not to be construed as limiting the scope of the present invention in any way.

In order to demonstrate the water repellency effectiveness of the compositions of the instant invention, a number of compositions shown in tables I, II and III were prepared in accordance with the heretofore described procedures. Ten-inch

TABLE I

| Component | Composition | | | | | |
|---|---|---|---|---|---|---|
| | 1 | 2 | 3 | 4 | 5 | 6 |
| Pentaerythritol ester [1] | 12 | 12 | 12 | 12 | 12 | 12 |
| Paraffin wax [2] | 3 | 3 | 3 | 3 | 3 | 3 |
| Pentachlorophenol | 3 | 3 | 3 | 3 | 3 | 3 |
| Diethylethanol amine | 4.4 | 3.5 | 3.5 | 3.5 | 4.0 | |
| Dimethylethanolamine | | | | | | 3 |
| Mineral spirits | 61.5 | 62.0 | 62.0 | 62.0 | 26.5 | 62.6 |
| Versene 100 [3] | 1 | 1 | 1 | 1 | 1 | 1 |
| Water | 10 | 10 | 10 | 10 | 10 | 10 |
| Low rosin tall oil fatty acids [4] | 5.5 | | | | 5.5 | 5.4 |
| Tall oil heads | | 5.5 | | | | |
| Linoleic acid | | | 5.5 | | | |
| Oleic acid | | | | 5.5 | | |
| No. 40 base oil [6] | | | | | 35.0 | |
| Dilution ratio volume composition to volume water | 1:9 | 1:9 | 1:9 | 1:9 | 1:9 | 1:9 |
| Percent effectiveness 1st immersion | 72 | 77 | 79 | 60 | 65 | 56 |
| Percent effectiveness 2nd immersion | 61 | 64 | 74 | 25 | 70 | |

[1] Pentaerythritol ester containing 8.3% free rosin acids and exhibiting 91.7% esterification of fatty and rosin acids.
[2] M.P. 125/130° F.
[3] Tetrasodium salt of ethylenediaminetetraacetic acid.
[4] Analysis—95.2% fatty acids, 3.0% rosin acids, 1.8% unsaponifiables.
[5] Analysis—68% fatty acids, 2% rosin acids, 30% unsaponifiables.
[6] Petroleum based derivative—initial boiling point 518° F.

TABLE II

| Component | Composition | | | | |
|---|---|---|---|---|---|
| | 7 | 8 | 9 | 10 | 11 |
| Pentaerythritol Ester [1] | 8.1 | 8.1 | 8.1 | 8.1 | 8.1 |
| Paraffin wax [2] | 2.0 | 2.0 | 2.0 | 2.0 | 2.0 |
| Pentachlorophenol | 2.0 | 2.0 | 2.0 | 2.0 | 2.0 |
| Low rosin tall oil fatty acids [3] | 3.7 | 3.7 | 3.7 | 3.7 | 3.7 |
| Diethylethanol amine | 2.7 | 2.7 | 2.7 | 2.7 | 2.7 |
| Versene 100 [4] | 1.9 | 1.0 | 1.0 | 1.0 | 1.0 |
| Water | 33.0 | 33.0 | 33.0 | 33.0 | 33.0 |
| Azo yellow pigments [5] | 6.0 | 6.0 | 6.0 | 6.0 | 6.0 |
| Mineral spirits | 41.5 | 17.9 | 17.9 | 17.9 | 28.0 |
| Solvent No. 1 [6] | | 23.6 | | | |
| Solvent No. 2 [7] | | | 23.6 | | 13.5 |
| No. 40 base oil [8] | | | | 23.6 | |
| Dilution ratio volume composition to volume water | 1:9 | 1:9 | 1:9 | 1:9 | 1:9 |
| Percent effectiveness 1st immersion | 80 | 67 | 79 | 68 | 84 |
| Percent effectiveness 2nd immersion | 78 | 59 | 80 | 69 | 81 |

[1] Pentaerythritol ester containing 8.3% free rosin acids and exhibiting 91.7% esterification of fatty and rosin acids.
[2] M.P. 125/130° F.
[3] Analysis—95.2% fatty acids, 3.0% rosin acids, 1.8% unsaponifiables.
[4] Tetrasodium salt of ethylenediaminetetraacetic acid.
[5] Harshaw azo yellow—1215.
[6] Eastman solvent 07-8437 basically a mixture of $C_8$ to $C_{16}$ alcohols.
[7] Shellflex 213, initial boiling point 566° F.
[8] Petroleum based derivative—initial boiling point 518° F.

TABLE III

| Component | Composition | | | | |
|---|---|---|---|---|---|
| | 12 | 13 | 14 | 15 | 16 |
| Pentaerythritol ester [1] | 8.1 | 8.1 | 8.0 | 6.7 | 8.1 |
| Paraffin wax [2] | 2.0 | 2.0 | 1.2 | 1.7 | 2.0 |
| Pentachlorophenol | 2.0 | 2.0 | 2.0 | 1.7 | 2.0 |
| Low rosin tall oil fatty acids [3] | 3.7 | 3.7 | 3.7 | 3.0 | 3.7 |
| Diethylethanol amine | 2.7 | 2.7 | 2.7 | 2.2 | 2.7 |
| Versene 100 [4] | 1.0 | 1.0 | 1.0 | 1.0 | 1.0 |
| Water | 33.0 | 33.0 | 33.0 | 44.5 | 33.0 |
| Azo yellow pigment [5] | 6.0 | 6.0 | 6.0 | 4.5 | 6.0 |
| Mineral spirits | 34.7 | 34.7 | 42.4 | 34.7 | 41.5 |
| Solvent No. 1 [6] | | 6.8 | | | |
| Solvent No. 2 [7] | 6.8 | | | | |
| No. 40 base oil [8] | | | | | |
| Dilution ratio volume composition to volume water | 1:9 | 1:9 | 1:9 | 1:9 | 1:9 |
| Percent effectiveness 1st immersion | 83 | 67 | 55 | 57 | 58 |
| Percent effectiveness 2nd immersion | 81 | 50 | | | |

[1] Pentaerythritol ester containing 8.3% free rosin acids and exhibiting 91.7% esterification of fatty and rosin acids.
[2] M.P. 125/130° F.
[3] Analysis—95.2% fatty acids, 3.0% rosin acids, 1.8% unsaponifiables.
[4] Tetrasodium salt of ethylenediaminetetraacetic acid.
[5] Harshaw azo yellow—1215.
[6] Eastman solvent 07-8437 bascially a mixture of $C_8$ to $C_{16}$ alcohols.
[7] Shellflex 213, initial boiling point 566° F.
[8] Petroleum based derivative—initial boiling point 518° F.

Ponderosa pine end-notched wafers prepared in accordance with Federal specification TT-W-572 water-repellency test procedure were immersed in the diluted compositions for 3 minutes and allowed to air dry for 1 week, and after conditioning for 2 weeks at 65 percent relative humidity at 80° F. were immersed in water for 30 minutes and the tangential elongation determined. The test was repeated on the initial samples, the results of which are reported as "after second immersion."

The shear stability tests give an indication of the breakdown of the products when pumped through spray systems prior to the spraying of lumber. The instability to shear is the primary reason for the plugging of spray systems presently in use in lumber mills.

As a test of mechanical shear resistance, compositions were prepared as shown in table IV. The test is performed by agitating 300 milliliters of the diluted composition in a Waring blender at high speed for 3 minutes. The dilution is then poured through an 80-mesh wire screen and washed with water to determine any occurrence of product coagulation.

TABLE IV

| Component | Composition | | | | |
|---|---|---|---|---|---|
| | 17 | 18 | 19 | 20 | 21 |
| Pentaerythritol ester [1] | 12 | 12 | 8.1 | 5.8 | 5.5 |
| Paraffin wax [2] | 3.0 | 3.0 | 2.0 | 1.4 | 1.35 |
| Pentachlorophenol | 3.0 | 3.0 | 2.0 | 1.4 | 1.35 |
| Low rosin tall oil fatty acids [3] | 5.5 | 5.5 | 3.7 | 2.6 | 2.5 |
| Diethylethanol amine | 4.0 | 4.0 | 2.7 | 1.9 | 1.0 |
| Mineral spirits | 61.5 | 61.5 | 40.7 | 29.9 | 28.5 |
| Versene [4] | 1.0 | 1.0 | 1.0 | | 1.0 |
| Water | 10.0 | 10.0 | 33.0 | 41.0 | 44.0 |
| Azo yellow pigment [5] | | | 6.0 | | |
| Red oxide pigment [6] | | | | 15 | 8.0 |
| Lamp black pigment [7] | | | | 1 | |
| Chrome yellow pigment [8] | | | | | 6.0 |
| Dilution ratio volume composition to volume water | 1:9 | 1:15 | 1:9 | 1:9 | 1:9 |

[1] Pentaerythritol ester containing 8.3% free rosin acids and exhibiting 91.7% esterification of fatty and rosin acids.
[2] M.P. 125/130° F.
[3] Analysis—95.2% fatty acids, 3.0% rosin acids, 1.8% unsaponifiables.
[4] Tetrasodium salt of ethylenediaminetetraacetic acid.
[5] Harshaw—1215.
[6] Harshaw—3040.
[7] Harshaw—7017.
[8] Harshaw—1031.

The condition of the diluted compositions 17 through 21 after 3 minutes of shear are as follows:

Composition 17—Excellent—all the diluted product passed through the 80-mesh screen.

Composition 18—Excellent—all the diluted product passed through the 80-mesh screen.

Composition 19—Good—trace of yellow pigment left on the 80-mesh screen.

Composition 20—Good—trace of red pigment was left on the 80-mesh screen.

Composition 21—Good—trace of pigment was left on the 80-mesh screen.

The above test results show the excellent shear stability properties of the compositions of the instant invention.

It has been further found that lumber treated with unpigmented and pigmented compositions of this invention may be painted in its end use in construction. Exposure tests were run on flat-grained Southern yellow pine boards which were painted after application of the unpigmented and pigmented compositions. One and two coat applications of an outside white oil-based paint (Federal specification TT-P-102) were made over the treated lumber allowing 24 hours between applications. It was found that kiln-dried boards treated with the compositions 17, 19 19 20 shown in table IV could be painted over. After outdoor exposure of 4 to 5 months, there is no difference in adhesion between the painted water repellent treated wood and the untreated wood. None of the tested products bled through the paint and the paint film held up well during the exposure period.

From the foregoing results it is evident that the compositions of this invention as illustrated by the compositions set forth in tables I, II, III and IV exhibit the desirable characteristics for a water repellent system as being compatible with pentachlorophenol, readily emulsifies in water, is stable to mechanical shear, wets the surface of the substrate and dries rapidly to form a water repellent surface. Additionally the pigmented water repellent system imparts a permanent color to the wood so treated.

While this invention has been described with certain embodiments it is not so limited and it is to be understood that variations and modifications thereof may be made which are obvious to those skilled in the art without departing from the spirit or scope of this invention.

The embodiments of the invention in which an exclusive property or privilege is claimed are defined as follows:

1. A composition comprising from about 1 to about 30 percent of a pentaerythritol ester of rosin acids and rosin and fatty acid mixtures, from about 0.1 to about 20 percent of polychlorophenol, from about 1 to about 10 percent wax, from about 1 to about 15 percent low-titer $C_{10}$-$C_{20}$ fatty acids, from about 1 to about 20 percent $C_1$-$C_4$ alkyl alkanol amine, from about 30 to about 80 percent of a water immiscible solvent and from about 0 to about 25 percent water.

2. A composition comprising from about 0.4 to about 30 percent of a pentaerythritol ester of acids selected from the group consisting of rosin acids and rosin and fatty acid mixtures, from about 1 to about 20 percent of polychlorophenol, from about 2 to about 8 percent wax, from about 4 to about 8 percent low-titer $C_{10}$-$C_{20}$ fatty acids, from about 3 to about 18 percent $C_1$-$C_4$ alkyl alkanol amine, from about 30 30 about 80 percent of a water immiscible solvent, and from about 7 to about 15 percent water.

3. A composition of claim 1 wherein the polychlorophenol is pentachlorophenol.

4. A composition of claim 1 wherein the wax is a paraffin wax having a melting point of from about 100° to about 150° F.

5. A composition of claim 1 wherein the alkyl alkanol amine is diethylethanol amine.

6. A composition of claim 1 wherein the alkyl alkanol amine is dimethylethanol amine.

7. A composition of claim 1 wherein the water immiscible solvent is mineral spirits.

8. A composition of claim 2 wherein the polychlorophenol is pentachlorophenol.

9. A composition of claim 2 wherein the wax is a paraffin wax having a melting point of from about 100° to about 150° F.

10. A composition of claim 2 wherein the alkyl alkanol amine is diethylethanol amine.

11. A composition of claim 2 wherein the alkyl alkanol amine is dimethylethanol amine.

12. A composition of claim 2 wherein the water immiscible solvent is mineral spirits.

13. A composition comprising from about 1 to about 25 percent of a pentaerythritol ester of acids selected from the group consisting of rosin acids and rosin and fatty acid mixtures, from about 0.1 to about 16 percent polychlorophenol, from about 0.1 to about 3 percent wax, from about 1.0 to about 8 percent low-titer $C_{10}$-$C_{20}$ fatty acids, from about 1 to about 15 percent $C_1$-$C_4$ alkyl alkanol amine, from about 10 percent to about 65 percent of a water immiscible solvent, from about 0.1 to about 20 percent of a water dispersable pigment and from about 15 to about 70 percent water.

14. A composition comprising from about 1.7 to about 23.3 percent pentaerythritol ester of acids selected from the group consisting of rosin acids and rosin and fatty acids mixtures, from about 0.4 to about 15.7 percent polychlorophenol, from about 0.4 to about 2.3 percent wax, from about 1.7 to about 6.3 percent low-titer $C_{10}$-$C_{20}$ fatty acids, from about 1.3 to about 14.0 percent $C_1$-$C_4$ alkyl alkanol amine, from about 13 to about 62.7 percent of a water immiscible solvent, from about 3 to about 20 percent of a water dispersable pigment and from about 20 to about 65 percent water.

* * * * *